(12) United States Patent
Yukawa

(10) Patent No.: US 8,404,776 B2
(45) Date of Patent: Mar. 26, 2013

(54) WATER-BASED PAINT COMPOSITIONS AND MULTILAYER COATING FILM-FORMING METHODS

(75) Inventor: Yoshiyuki Yukawa, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 295 days.

(21) Appl. No.: 12/866,339

(22) PCT Filed: Mar. 6, 2009

(86) PCT No.: PCT/JP2009/054822
§ 371 (c)(1),
(2), (4) Date: Aug. 5, 2010

(87) PCT Pub. No.: WO2009/116454
PCT Pub. Date: Sep. 24, 2009

(65) Prior Publication Data
US 2010/0323211 A1    Dec. 23, 2010

(30) Foreign Application Priority Data

Mar. 18, 2008   (JP) .................................. 2008-69631

(51) Int. Cl.
*C08L 67/02* (2006.01)
*C08L 33/04* (2006.01)
(52) U.S. Cl. .......................... 524/502; 524/501; 524/556
(58) Field of Classification Search .................. 524/502, 524/501, 556
See application file for complete search history.

(56) References Cited

U.S. PATENT DOCUMENTS

| | | | |
|---|---|---|---|
| 5,627,249 A | 5/1997 | Doki et al. | |
| 7,087,672 B2 * | 8/2006 | Yuan et al. | 524/507 |
| 7,141,625 B2 * | 11/2006 | Komazaki et al. | 524/539 |
| 2003/0138634 A1 | 7/2003 | Kato et al. | |
| 2003/0187125 A1 | 10/2003 | Okazaki et al. | |
| 2003/0212192 A1 | 11/2003 | Yuan et al. | |
| 2004/0134791 A1 | 7/2004 | Toi et al. | |
| 2004/0242756 A1 | 12/2004 | Komazaki et al. | |
| 2006/0135678 A1 | 6/2006 | Kato et al. | |
| 2010/0093914 A1 * | 4/2010 | Yukawa et al. | 524/502 |

FOREIGN PATENT DOCUMENTS

| | | |
|---|---|---|
| DE | 102 50 631 | 5/2003 |
| JP | 4-093374 | 3/1992 |
| JP | 2004-2729 | 1/2004 |
| JP | 2004-67995 | 3/2004 |
| JP | 2004-137504 | 5/2004 |
| JP | 2004-292775 | 10/2004 |
| WO | 2004/061025 | 7/2004 |

OTHER PUBLICATIONS

International Search Report issued Jun. 30, 2009 in International (PCT) Application No. PCT/JP2009/054822 and theWritten Opinion.

* cited by examiner

*Primary Examiner* — Satya Sastri
(74) *Attorney, Agent, or Firm* — Wenderoth, Lind & Ponack, L.L.P.

(57) ABSTRACT

The invention offers water-based paint compositions which comprise, as the polyester resin, a polyester resin whose constituent acid component contains no less than a specific amount of alicyclic polyvalent carboxylic acid (inclusive of anhydride of the acid) and which has an acid value and hydroxyl value each falling within a specific range; and as the high molecular weight resin, water-dispersible acrylic polymer particles having specific absorbance characteristics, i.e., having an absorbance not higher than a specific value as measured with a spectrophotometer in a state of a liquid dispersion at a specific low concentration in dioxane solvent, and also having a weight average molecular weight of at least 1,100,000; and multilayer coating film-forming methods using the water-based paint compositions.

15 Claims, No Drawings

WATER-BASED PAINT COMPOSITIONS AND MULTILAYER COATING FILM-FORMING METHODS

This application is a U.S. national stage of International Application No. PCT/JP2009/054822 filed Mar. 6, 2009.

TECHNICAL FIELD

This invention relates to water-based paint compositions which are excellent in storage stability and coating film performance such as finished appearance, chipping resistance and water resistance, and also to multilayer coating film-forming methods using the compositions.

BACKGROUND ART

Recently, environmental problems on global scale are gathering keen attention. In also the automotive industry, attempts for environmental improvement in the manufacturing steps are positively advanced. Manufacturing steps of automotives give rise to such problems as global warming, generation of industrial waste and discharge of volatile organic compounds (VOC). In particular, most of the VOC is discharged during the coating steps and effective countermeasure is of urgent necessity.

Outer panel portion of automobile bodies are normally coated with multilayer coating film formed of undercoat film of cationic electrocoating, intermediate coat film and top coat film, for imparting corrosion resistance and for aesthetic purpose. With the view to reduce VOC discharge, use of water-based paints for intermediate and top coatings is promoted.

Coating film on automobiles is, moreover, required to excel in the film performance, in particular, high finished appearance, chipping resistance (resistance to damages by gravel knocked off by running cars) and water resistance. In respect of the chipping resistance, the intermediate coating film plays particularly important role.

However, conventional water-based paint in general is inferior in coating film performance such as mechanical properties and water resistance, as compared with organic solvent-based paint.

As water-based intermediate paint, generally water-based paint compositions whose chief components are polyester resin and hardening agent are used. Where aliphatic polybasic acid-derived polyester resin is used as the polyester resin in such compositions, the resulting coating film excels in chipping resistance but storage stability of the paint tends to become inferior.

Whereas, when polyester resin formed with use of aromatic polybasic acid is used, the paint shows insufficient storage stability and its coating film tends to have inferior chipping resistance. Thus in developing water-based intermediate paint, optimization of the polyester resin is in demand.

To meet such demand, JP 2004-67995A discloses that aqueous resin compositions comprising polyester resin, whose at least 70% of polybasic acid component is aromatic acid and alicyclic acid, specific vinyl-modified polyester resin and hardening agent, exhibit excellent storage stability and can form coating film excelling in chipping resistance. However, coating films obtained of the aqueous resin compositions occasionally show inferior smoothness and water resistance.

JP 2004-292775A discloses that resin compositions for water-based paint which comprise polyester resin, whose at least 70 mol % of polybasic acid component is aromatic acid and alicyclic acid, vinyl-modified epoxy ester resin and hardening agent, exhibit excellent storage stability and can form coating film excelling in chipping resistance. However, coating films obtained of the aqueous resin compositions occasionally show inferior smoothness and water resistance.

JP 2004-2729A discloses that a water-based intermediate paint comprising polyester resin whose essential constituent components are alicyclic polybasic acid and/or alicyclic polyhydric alcohol, other polybasic acid and other polyhydric alcohol; crosslinking agent; and aqueous urethane resin emulsion; shows favorable stability and can form multilayer film excelling in chipping resistance and finished appearance. However, coating films obtainable from the water-based intermediate paint occasionally fail to have sufficient distinctness of image.

JP Hei 4 (1992)-93374A discloses that a water-based intermediate paint whose chief components are polyester resin having specific acid value, hydroxyl value and number-average molecular weight, aqueous amino resin, specific low molecular weight polyesterdiol and alkyl-etherified benzoin possesses excellent coating workability and can form coating film of excellent chipping resistance, smoothness and moistureproofness. The coating films obtained of the water-based intermediate paint, however, are occasionally inferior in water resistance.

Also International Publication WO 04/61025 discloses a paint composition which contains a copolymer resin emulsion to which self crosslinkability is imparted and which has a Tg, acid value and hydroxyl value each falling within a specific range, and a multilayer coating film-forming method using the paint composition, as a water-based intermediate paint composition which, when used to form a multilayer coating film, gives high chipping resistance and water resistance, and shows good compatibility with top coat and undercoat, and also excellent finished appearance, and a multilayer coating film-forming method using the composition. The weight-average molecular weight of the copolymer resin emulsion used therein is, however, around 50,000-1,000,000 and its effect for improving coating film performance such as chipping resistance is insufficient.

While it is generally effective for improving coating film performance to use high molecular weight resins (in particular, acrylic resin), there is a problem that use of, for example, intraparticulate crosslinking type high molecular weight acrylic resin emulsion degrades finished appearance such as coated surface smoothness, and coating workability.

JP 2004-137504A discloses aqueous acrylamide polymer solution having a weight-average molecular weight of 500,000-10,000,000 at specific concentration and viscosity ranges, as an aqueous high molecular weight polymer solution. The main utility of the polymer, however, is paper reinforcing agent. It is unsuitable for use in paint, because it shows unsatisfactory finished appearance and coating workability as a high molecular weight acrylic resin for paint use and coating film formed thereof has insufficient water resistance.

SUMMARY OF THE INVENTION

The object of the present invention is to provide water-based paint compositions having high storage stability, which can form coating film excelling in finished appearance such as coated surface smoothness and also of excellent performance in such properties as chipping resistance and water resistance.

We fixed our eyes particularly on the influence of the polyester resin and high molecular weight resin as the base resin component in water-based paint compositions, on coating film performance and coated surface smoothness, and made concentrative studies. In consequence, we now discovered that the above object could be accomplished with use of a water-based paint composition which comprises, as the polyester resin, a polyester resin whose constituent acid component contains no less than a specific amount of alicyclic polyvalent carboxylic acid (inclusive of anhydride of the acid) and which has an acid value and hydroxyl value each falling within a specific range; and as the high molecular weight resin, water-dispersible acrylic polymer particles having specific absorbance characteristics, i.e., having an absorbance not higher than a specific value as measured with a spectrophotometer in a state of a liquid dispersion at a specific low concentration in dioxane solvent, and also having a weight average molecular weight of at least 1,100,000. Whereupon the present invention came to be completed.

Thus, the present invention provides a water-based paint composition comprising polyester resin (A), water-dispersible acrylic polymer particles (B) and hardening agent (C), characterized in that the polyester resin (A) is a polyester resin having a hydroxyl value of 100-200 mgKOH/g and an acid value of 10-35 mgKOH/g, which is obtained by reaction of an acid component and an alcoholic component, the alicyclic polyvalent carboxylic acid (inclusive of the acid anhydride) (a-1) content of the acid component being at least 30 mol % based on the total acid component, and the polymer particles (B) have a weight-average molecular weight of at least 1,100,000 and an absorbance not higher than 0.2 at the wavelength of 330 nm as measured with spectrophotometer in the state of a liquid dispersion at a mass concentration of 1.35% in 1,4-dioxane solvent.

The invention also provides a multilayer coating film-forming method comprising applying onto a coating object an intermediate paint and a top paint successively, characterized in that the above water-based paint composition is used as the intermediate paint.

The invention furthermore provides a multilayer coating film-forming method, characterized by comprising applying onto a coating object the above water-based paint composition as the intermediate paint, applying onto the unhardened coated surface thereof a water-based base coat paint, further applying onto the unhardened coated surface thereof a clear coat paint, and hardening the three-layered coating film formed of the intermediate coat, base coat and clear coat simultaneously.

Because the polyester resin (A) in the water-based paint composition of the invention is a relatively high hydroxyl value polyester resin containing at least the specified amount of alicyclic polyvalent carboxylic acid (inclusive of the acid anhydride) as a constituent component, the composition excels in storage stability and can form coating film excelling in chipping resistance.

The water-dispersible acrylic polymer particles (B) which are contained in the water-based paint composition of the invention have a unique property that their liquid dispersion in 1,4-dioxane solvent has extremely high transparency, although they have such a high weight-average molecular weight as at least 1,100,000.

For water-based paint containing high molecular weight polymer particles, usually crosslinked polymer particles are used as the polymer particles in many cases, and their dispersions in 1,4-dioxane solvent show low transparency. When a water-based paint in which such polymer particles are used is made a coating film, the polymer particles are apt to be irregularly distributed in the coating film, like islands in a sea-island structure.

By contrast, the water-dispersible acrylic polymer particles (B) contained in the water-based paint composition of the present invention have the above characteristics, low degree of crosslinkage and high chain linearity, and when the composition forms coating film, the high molecular weight polymer particles can be uniformly distributed in the coating film in continuous phase, unlike the case of water-based paint in which polymer particles whose dispersion in 1,4-dioxane solvent has low transparency. Hence the water-based paint composition of the present invention has good flow characteristics although it contains the high molecular weight polymer particles as a constituent component, and can form coating film excelling in finished appearance such as coated surface smoothness.

The water-based paint composition of the invention can form coating film excelling also in such performance as chipping resistance and water resistance, because the physical properties of its coating film are improved by the use of the polymer particles having above characteristics.

Thus, the present invention brings about the conspicuous effect of providing a water-based paint composition excelling in all of storage stability, finished appearance such as coated surface smoothness and the coating film performance such as chipping resistance and water resistance.

Hereinafter the water-based paint composition of the present invention is explained in further details.

DESCRIPTION OF EMBODIMENTS

The water-based paint composition of the present invention (which may be hereafter referred to as "the present paint") comprises the polyester resin (A), water-dispersible acrylic polymer particles (B) and hardening agent (C).

Polyester Resin (A)

The polyester resin (A) used in the water-based paint composition of the present invention is obtained through reaction of an acid component and alcoholic component, the alicyclic carboxylic acid (inclusive of the acid anhydride) (a-1) content in the acid component being at least 30 mol %, preferably 35-100 mol %, inter alia, 40-90 mol %, based on the total amount of the acid component, and has a hydroxyl value of 100-200 mgKOH/g and an acid value of 10-35 mgKOH/g.

From the viewpoint of the chipping resistance, smoothness and water resistance of resulting coating film, the polyester resin (A) preferably has a hydroxyl value within a range of 120-180 mgKOH/g, in particular, 130-170 mgKOH/g, and an acid value within a range of 12-30 mgKOH/g, in particular, 15-25 mgKOH/g.

The alicyclic polyvalent carboxylic acid (inclusive of the acid anhydride) (a-1) includes those compounds containing at least one alicyclic structure (preferably 4- to 6-membered ring structure) and at least two carboxyl groups per molecule, and acid anhydrides of the compounds, specific examples including 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, 4-cyclohexene-1,2-dicarboxylic anhydride, 3-methyl-1,2-cyclohexanedicarboxylic acid, 3-methyl-1,2-cyclohexanedicarboxylic anhydride, 4-methyl-1,2-cyclohexanedicarboxylic acid, 4-methyl-1,2-cyclohexanedicarboxylic anhydride, 1,2,4-cyclohexanetricarboxylic acid, 1,2,4-cyclohexanetricarboxylic acid-1,2-anhydride, Het acid and the like. Of those, 1,2-cyclohexanedicarboxylic acid and 1,2-cyclohexanedicarboxylic anhydride can be conveniently used. The above alicyclic polyvalent carboxylic acids (including their anhydrides) (a-1) can be used either alone or in combination of two or more.

Other acid component(s) which can be concurrently used with the alicyclic polyvalent carboxylic acid (including the acid anhydride) (a-1) are not particularly limited, and those customarily used for polyester resin preparation are similarly useful, examples of which include aliphatic polyvalent carboxylic acids (including the acid anhydrides) such as succinic acid, glutaric acid, adipic acid, pimelic acid, suberic acid, azelaic acid, sebacic acid, undecanedioic acid, dodecanedioic acid, brassylic acid, octadecanedioic acid, citric acid, maleic acid, fumaric acid, itaconic acid and anhydrides thereof; aromatic polyvalent carboxylic acids (including the acid anhydrides) such as phthalic acid, phthalic anhydride, isophthalic acid, terephthalic acid, trimellitic acid, trimellitic anhydride, pyromellitic acid, pyromellitic anhydride, naphthalenedicarboxylic acid and the like; fatty acids such as coconut oil fatty acid, cotton seed oil fatty acid, hemp seed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid and the like; benzoic acid, 4-tert-butylbenzoic acid and the like.

As the alcoholic component, polyhydric alcohols containing at least two hydroxyl groups per molecule can be conveniently used, specific examples including dihydric alcohols such as ethylene glycol, propylene glycol, diethylene glycol, trimethylene glycol, triethylene glycol, tetraethylene glycol, dipropylene glycol, 1,4-butanediol, 1,3-butanediol, 2,3-butanediol, 1,2-butanediol, 3-methyl-1,2-butanediol, 2,2-diethyl-1,3-propanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid neopentyl glycol ester and the like; polylactonediols formed by addition of lactones such as s-caprolactone to these dihydric alcohols; esterdiols such as bis(hydroxyethyl)terephthalate and the like; polyetherdios such as alkylene oxide adducts of bisphenol A, polyethylene glycol, polypropylene glycol, polybutylene glycol and the like; at least trihydric alcohols such as glycerin, trimethylolpropane, trimethylolethane, diglycerin, triglycerin, 1,2,6-hexanetriol, pentaerythritol, dipentaerythritol, sorbitol, mannitol and the like; polylactone polyols formed by adding lactones such as ε-caprolactone to these at least trihydric alcohols; and alicyclic polyhydric alcohols such as 1,3-cyclohexanedimethanol, 1,4-cyclohexanedimethanol, tricyclodecanedimethanol, hydrogenated bisphenol A, hydrogenated bisphenol F and the like.

Of the above-named alcoholic component, those containing at least 40 mol %, in particular, within a range of 45-90 mol %, inter alia, 50-80 mol %, based on the total alcoholic component of the diol (a-2) having branched alkylene group and containing at least 5 carbon atoms are preferred from the viewpoint of adherability, smoothness and water resistance of resulting coating film.

As the diol (a-2) having a branched alkylene group and containing at least 5 carbon atoms, among the above dihydric alcohols, 3-methyl-1,2-butanediol, 2,2-diethyl-1,3-propanediol, 2-butyl-2-ethyl-1,3-propanediol, 2,3-dimethyltrimethylene glycol, 3-methyl-4,3-pentanediol, 3-methyl-1,5-pentanediol, 2,2,4-trimethyl-1,3-pentanediol, and neopentyl glycol can be named.

The alcoholic component also preferably contains, as an alcohol component other than the above alcohols, hydroxy acid (a-3) having at least two hydroxyl groups, within a range of normally 1-20 mol %, in particular, 1.5-15 mol %, inter alia, 2-10 mol %, based on the total amount of the alcoholic component, from the viewpoint of resistance to hydrolysis of resulting polyester resin (A) and inter-layer adherability of the coating film formed from the resulting paint.

The carboxyl groups introduced into the polyester resin by the use of the hydroxy acid (a-3) having at least two hydroxyl groups exhibit better resistance to hydrolysis compared to those introduced by the conventionally practiced carboxyl group-introducing method into polyester resin, i.e., half-esterification by reaction of acid anhydride of polybasic acid such as trimellitic anhydride with hydroxyl groups in the polyester resin, and therefore are preferred.

As the hydroxy acid (a-3) having at least two hydroxyl groups, for example, 2,2-dimethylolpropionic acid, 2,2-dimethylolbutanoic acid, 2,2-dimethylolpentanoic acid, 2,2-dimethylolhexanoic acid, 2,2-dimethyloloctanoic acid, 2,2-dimethylolbutyric acid, 2,2-dimethylolvaleric acid, and polyesterpolyols or polyetherpolyols obtained by condensation of the foregoing, can be named.

Furthermore, as the alcoholic component other than the above-named alcohols, for example, α-olefin epoxides such as propylene oxide, butylene oxide and the like; and alcoholic compound obtained through reaction of monoepoxide compound such as CARDURA E10 (tradename, HEXION Specialty Chemicals, Inc., a glycidyl ester of synthetic highly branched saturated fatty acid) with an acid and the like can be named.

Method of synthesizing the polyester resin (A) is not particularly limited but the synthesis can be carried out according to conventional practice. For example, above-described alcoholic component and acid component can be heated in nitrogen gas current at about 150-about 250° C. for around 5-10 hours to effect esterification reaction of the hydroxyl groups with carboxyl groups.

In the occasion of esterifying the acid component and alcoholic component, they may be added all at once or added dividedly in several times. It is also permissible to first synthesize a hydroxyl-containing polyester resin and then reacting it with acid anhydride to effect half-esterification.

In the esterification reaction, per se known catalyst, for example, dibutyltin oxide, antimony trioxide, zinc acetate, manganese acetate, cobalt acetate, calcium acetate, lead acetate, tetrabutyl titanate, tetraisopropyl titanate and the like may be used to promote the reaction.

The polyester resin (A) may also be modified with fatty acid, monoepoxy compound, polyisocyanate compound and the like, either during its preparation or after the esterification.

As the fatty acid, for example, (semi)drying oil fatty acids such as linseed oil fatty acid, coconut oil fatty acid, safflower oil fatty acid, soybean oil fatty acid, sesame oil fatty acid, perilla oil fatty acid, hempseed oil fatty acid, tall oil fatty acid, dehydrated castor oil fatty acid and the like can be named. Suitable use rate of such fatty acid is generally not higher than 30 wt % in terms of the oil length. The polyester resin may also be such that has been partially reacted with monobasic acid such as benzoic acid.

As the monoepoxy compound, for example, α-olefin epoxides such as propylene oxide, butylene oxide and the like; and aforesaid CARDURA E10 (tradename, HEXION Specialty Chemicals Inc., glycidyl ester of synthetic highly branched saturated fatty acid) and the like can be named.

As the polyisocyanate compound, for example, aliphatic diisocyanates such as lysine diisocyanate, hexamethylene diisocyanate, trimethylhexane diisocyanate and the like; alicyclic diisocyanates such as hydrogenated xylylene diisocyanate, isophorone diisocyanate, methylcyclohexane-2,4(or 2,6)-diisocyanate, 4,4'-methylenebis(cyclohexylisocyanate), 1,3-(isocyanatomethyl)cyclohexane and the like; aromatic diisocyanates such as tolylene diisocyanate, xylylene diisocyanate, diphenylmethane diisocyanate and the like; organic polyisocyanates per se such as trivalent or higher valent polyisocyanates like lysine triisocyanate, adducts of each of these organic polyisocyanates with polyhydric alcohol, low molecular weight polyester resin or water, or cyclic polymers formed of same kind of organic diisocyanates as named in the above (e.g., isocyanurate), and biuret type adducts can be named. These can be used either alone or in combination of two or more.

The reaction ratio of the hydroxyl-containing polyester resin with polyisocyanate compound is not particularly limited, so long as the urethane-modified polyester resin resulting from the reaction comes to have a hydroxyl value within a range of 100-200 mgKOH/g and an acid value within a range of 10-35 mgKOH/g.

The polyester resin (A) preferably has a number-average molecular weight within a range of generally 300-50,000, in particular, 500-20,000 inter alia, 800-10,000, from the viewpoint of smoothness and performance of resulting coating film.

In the present specification, "number-average molecular weight" and "weight-average molecular weight" are the values determined by converting each number-average molecular weight or weight-average molecular weight as measured by gel permeation chromatograph ("HLC8120GPC", tradename, Tosoh Corporation) based on the molecular weight of standard polystyrene. In this measurement, four columns of TSKgel G-4000HXL, TSKgel G-3000HXL, TSKgel G-2500-HXL and TSKgel G-2000HXL (tradename, Tosoh Corporation) were used under the conditions of: mobile phase; tetrahydrofuran, measuring temp.; 40° C., flow rate; 1 mL/min. and detector; RI.

The polyester resin (A) preferably is neutralized with a neutralizer, to facilitate its mixing with, and dispersing in, water.

As the neutralizer, for example, hydroxides of alkali metal or alkaline earth metal, such as sodium hydroxide, potassium hydroxide, lithium hydroxide, calcium hydroxide, barium hydroxide and the like; ammonia; primary monoamine compounds such as ethylamine, propylamine, butylamine, cyclohexylamine, monoethanolamine, isopropanolamine, neopentanolamine, 2-aminopropanol, 3-aminopropanol, 2-amino-2-methylpropanol and the like; secondary monoamine compounds such as diethylamine, dibutylamine, diethanolamine, dipropylamine, diisopropanolamine, N-methylethanolamine, N-ethylethanolamine, N-methylisopanolamine and the like; tertiary monoamine compounds such as triethylamine, tributylamine, dimethylethanolamine, diethylethanolamine, methyldiethanolamine, dimethylaminoethanol, triethanolamine, and the like; polyamine compounds such as ethylenedioamine, diethylenetriamine, hydroxyethylaminoethylamine, ethylaminoethylamine, methylaminopropylamine and the like; pyridine; morpholine and the like can be named. Of these, use of primary monoamine compound, secondary monoamine compound, tertiary monoamine compound or polyamine compound is preferred.

Water-Dispersible Acrylic Polymer Particles (B)

Water-dispersible acrylic polymer particles (B) in the present paint have a weight-average molecular weight of at least 1,100,000 and an absorbance at the wavelength of 330 nm not higher than 0.2, as measured with spectrophotometer as to their liquid dispersion in 1,4-dioxane solvent at a mass concentration of 1.35%.

The less the above absorbance value, the higher the transparency of the liquid dispersion of the polymer particles in 1,4-dioxane solvent, indicating very low degree of crosslinkage of the polymer particles. The water-dispersible acrylic polymer particles (B) in the present paint can have the absorbance value not higher than 0.2, preferably not higher than 0.15, inter alia, not higher than 0.1, in the state of their liquid dispersion in 1,4-dioxane solvent at a mass concentration of 1.35%, from the viewpoint of finished property of resulting coating film, and have the characteristics of having extremely high transparency, low degree of crosslinkage and high chain linearity.

In this specification, the liquid dispersion in 1,4-dioxane solvent encompasses both the solution and dispersion in which 1,4-dioxane serves as the solvent.

The absorbance of the water-dispersible acrylic polymer particles (B) in the state of a liquid dispersion in 1,4-dioxane solvent is determined as follows. An emulsion of water-dispersible acrylic polymer particles (B) is dried at ambient temperature and then formulated into a solution or dispersion in 1,4-dioxane solvent at a mass concentration of 1.35% to serve as the test specimen. The absorbance of so prepared test specimen is measured with a spectrophotometer under the condition of 330 nm in wavelength. The measured value is divided by the cell length (unit: cm) to obtain the absorbance per 1 cm. As the spectrophotometer, U-4100 (tradename, HITACHI Ltd.) is used.

The water-dispersible acrylic polymer particles (B) having such absorbance value can be obtained, for example, by emulsion polymerization of polymerizable unsaturated monomers represented by vinyl monomer in the presence of a dispersion stabilizer like surfactant, using radical polymerization initiator.

As polymerizable unsaturated monomers which can be emulsion-polymerized, for example, carboxyl-containing polymerizable unsaturated monomer (M-1), hydroxyl-containing polymerizable unsaturated monomer (M-2), other polymerizable unsaturated monomer (M-3) and polyvinyl compound (M-4) which contains at least two polymerizable unsaturated groups per molecule, can be named.

Carboxyl-containing polymerizable unsaturated monomers (M-1) include the compounds having at least one carboxyl group and one polymerizable unsaturated group per molecule, specific examples including acrylic acid, methacrylic acid, crotonic acid, maleic acid, itaconic acid and the like. Furthermore, acid anhydrides of these compounds and monocarboxylic acids formed by half-esterification of the acid anhydrides are included in the monomer (M-1) in the present specification.

Such carboxyl-containing polymerizable unsaturated monomers (M-1) are for introducing carboxyl groups into the water dispersible acrylic polymer particles (B) for imparting dispersibility in water thereto, and as the carboxyl-containing polymerizable unsaturated monomer (M-1), generally acrylic acid or methacrylic acid are frequently used. From the viewpoint of coating film performance such as water resistance, methacrylic acid can be conveniently used.

When acrylic acid is used, carboxyl groups in the formed polymer particles tend to be localized on the particle surfaces, because acrylic acid has higher degree of dissociation in water than methacrylic acid. Whereas, when methacrylic acid is used, carboxyl groups can be more easily uniformly distributed inside of the particles, than the case of using acrylic acid. When methacrylic acid is used for this reason, presumably the carboxyl groups which are hydrophilic groups come to be uniformly distributed inside the particles and water resistance (whitening resistance) of the coating film formed therefrom is improved over the case of using acrylic acid.

These carboxyl-containing polymerizable unsaturated monomers (M-1) can be used either alone or in combination of two or more.

Hydroxyl-containing polymerizable unsaturated monomers (M-2) are the compounds having one each of hydroxyl group and polymerizable unsaturated group per molecule, the hydroxyl group acting as the functional group to react with the crosslinking agent. As the monomers (M-2), monoesterified products of acrylic acid or methacrylic acid with $C_{2-10}$ dihydric alcohols are preferred, examples of which include hydroxyl-containing acrylate monomers such as 2-hydroxyethyl acrylate, 2-hydroxypropyl acrylate, 3-hydroxypropyl acrylate, 4-hydroxybutyl acrylate and the like; hydroxyl-containing methacrylate monomers such as 2-hydroxyethyl methacrylate, 2-hydroxypropyl methacrylate, 3-hydroxypropyl methacrylate, 4-hydroxybutyl methacrylate and the like; and N-methylolacrylamide, N-methylolmethacrylamide and the like.

Of these, hydroxyl-containing methacrylate monomers are preferred from the viewpoint of hardenability and water resistance of the coating film. Also among the hydroxyl-containing methacrylate monomers, 2-hydroxyethyl methacrylate is particularly preferred.

These hydroxyl-containing polymerizable unsaturated monomers (M-2) can be used either alone or in combination of two or more.

Other polymerizable unsaturated monomers (M-3) include the compounds having one polymerizable unsaturated group per molecule, other than above monomers (M-1) and (M-2), specific examples of which are enumerated in the following (1)-(8).

(1) Monoesterified products of acrylic acid or methacrylic acid with $C_{1-20}$ monohydric alcohols: for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, cyclohexyl acrylate, cyclohexyl methacrylate, lauryl acrylate, lauryl methacrylate, stearyl acrylate, stearyl methacrylate and the like.

(2) Aromatic vinyl monomers: for example, styrene, α-methylstyrene, vinyltoluene and the like.

(3) Glycidyl-containing vinyl monomers: compounds having at least one glycidyl group and one polymerizable unsaturated bond per molecule, specifically, for example, glycidyl acrylate, glycidyl methacrylate and the like.

(4) Nitrogen-containing $C_{1-20}$ alkyl (meth)acrylates: for example, dimethylaminoethyl acrylate, dimethylaminoethyl methacrylate and the like.

(5) Polymerizable unsaturated group-containing amide compounds: compounds having at least one amido group and one polymerizable unsaturated bond per molecule, for example, acrylamide, methacrylamide, dimethylacrylamide, N,N-dimethylpropylacrylamide, N-butoxymethylacrylamide, diacetonacrylamide and the like.

(6) Polymerizable unsaturated group-containing nitrile compounds: for example, acrylonitrile, methacrylonitrile and the like.

(7) Diene compounds: for example, butadiene, isoprene and the like.

(8) Vinyl compounds: for example, vinyl acetate, vinyl propionate, vinyl chloride and the like.

These other vinyl monomers (M-3) can be used either alone or in combination of two or more.

Polyvinyl compounds (M-4) are the compounds having at least two polymerizable unsaturated groups per molecule, and as examples of which ethylene glycol diacrylate, ethylene glycol dimethacrylate, triethylene glycol diacrylate, tetraethylene glycol dimethacrylate, 1,6-hexanediol diacrylate, allyl methacrylate, allyl acrylate, divinylbenzene, trimethylolpropane triacrylate, methylenebis(meth)-acrylamide, ethylenebis(meth)acrylamide and the like can be named. The polyvinyl compounds (M-4) do not include above diene compounds.

These polyvinyl compounds (M-4) can be used either alone or in combination of two or more.

The use ratios of the polymerizable unsaturated monomers in the production of the water-dispersible acrylic polymer particles (B) are as follows, based on the total amount of the polymerizable unsaturated monomers: the carboxyl-containing polymerizable unsaturated monomer (M-1) is within a range of generally 0.1-25 mass %, preferably 0.1-10 mass %, inter alia, 0.5-5 mass %, from the viewpoint of dispersibility in water and water resistance of the polymer particles; the hydroxyl-containing polymerizable unsaturated monomer (M-2) is, while differing depending on the kind and amount of the hardening agent used, within a range of generally 0.1-40 mass %, preferably 0.1-25 mass %, inter alia, 1-10 mass %, from the viewpoint of hardenability and water resistance of the coating film; and other polymerizable unsaturated monomer (M-3) can be within a range of generally 35-99.8 mass %, preferably 50-99.8 mass %, inter aha, 65-99.8 mass %.

Also from the viewpoint of imparting high molecular weight and reducing residual monomers, it is preferred that the combined amount of the acrylate monomers and styrene is within a range of generally 20-80 mass %, in particular, 30-60 mass %.

Polyvinyl compound (M-4) can be used where necessary, but from the viewpoint of obtaining water-dispersible acrylic polymer particles (B) showing the absorbance value not higher than 0.2 indicating high transparency, in other words, having extremely low degree of crosslinkage and chain linearity, it is preferable to use it in a very minor amount, even when used. Therefore, the use ratio of the polyvinyl compound (M-4) based on the total amount of the polymerizable unsaturated monomers preferably is within a range of generally 0-1 mass %, in particular, 0-0.3 mass %, inter alia, 0-0.05 mass %.

As the dispersion stabilizer, anionic emulsifier, nonionic emulsifier, amphoteric emulsifier and the like can be named, specific examples including, as anionic emulsifier, fatty acid, alkylsulfuric acid ester salt, alkylbenzenesulfonic acid salt, alkylphosphoric acid salt and the like; as nonionic emulsifier, polyoxyethylene alkyl ether, polyoxyethylene alkylallyl ether, polyoxyethylene derivatives, sorbitan fatty acid ester, polyoxyethylene sorbitan fatty acid ester, polyoxyethylene alkylamine, alkylalkanolamide and the like; and as amphoteric emulsifier, for example, alkylbetaine and the like.

As the dispersion stabilizer, reactive emulsifier can be used with particular advantage, from the viewpoint of copolymerizability of the vinyl monomers constituting the water-dispersible acrylic polymer particles (B) in the emulsion polymerization reaction, dispersion stability of the water-dispersible acrylic polymer particles (B) in the present paint, performance such as water resistance of the coating film formed from the present paint and reduction of residual monomer for environmental protection. Reactive emulsifier includes emulsifiers having radical-reactability with the vinyl monomers, in other words, surfactant having polymerizable unsaturated group(s) per molecule.

Specific examples of reactive emulsifier include ELEMINOL JS-1, ELEMINOL JS-2 (tradename, Sanyo Chemical Industries, Ltd.); S-120, S-180A, S-180, LATEMUL PD-104, LATEMUL PD-420, LATEMUL PD-430S, LATEMUL PD-450 (tradename, KAO Corporation); AQUALON HS-10, AQUALON KH-10 (tradename, Daiichi Kogyo Seiyaku Co., Ltd.); Adekariasoap SE-10N, Adekaria-soap SE-20N, Adekariasoap SR-1025, Adekariasoap ER-10, Adekaria Soap ER-20, Adekariasoap ER-30, Adekariasoap ER-40 (tradename, ADEKA Corporation); ANTOX MS-60 (tradename, Nippon Nyukazai Co., Ltd.) and the like.

Of the above reactive emulsifiers, particularly those having a polyoxyethylene group represented by a formula —$(CH_2CH_2O)_n$— (here n is an integer of 5-60, preferably 10-55, inter alia, 20-45) and polymerizable unsaturated group(s) per molecule are preferred. Specific examples of such reactive emulsifier include Adekariasoap ER-30, Adekariasoap ER-40 (tradename, ADECA Corporation) and LATEMUL PD-450 (tradename, KAO Corporation).

The water-dispersible acrylic polymer particles (B) synthesized with use of such a reactive emulsifier having the above polyoxyethylene groups and polymerizable unsaturated groups take the construction that the polyoxyethylene groups of the reactive emulsifier are grafted to the main chains of the water-dispersible acrylic polymer particles like branches, which act like a dispersion stabilizer for hydrophobic components such as pigment, hardener and the like in the paint composition in the state of a coating liquid, and also act as an agent to make the particles compatible with other components in the unhardened coating film. Hence they are particularly suitable as the water-dispersible acrylic polymer particles in the paint compositions of the present invention.

Dispersion stabilizers such as above-described emulsifiers can be used either alone or in combination of two or more in the emulsion polymerization reaction.

The use ratio of such dispersion stabilizer is preferably within a range of normally 0.1-10 mass %, in particular, 1-7.5 mass %, inter alia, 1.5-6 mass %, based on the formed water-dispersible acrylic polymer particles.

When a reactive emulsifier is used as the dispersion stabilizer, the use ratio of the reactive emulsifier is preferably within a range of normally 0.1-10 mass %, in particular, 1.5-7.5 mass %, inter alia, 2-6 mass %, based on the formed water-dispersible acrylic polymer particles.

As the radical polymerization initiator, for example, peroxides represented by ammonium persulfate, potassium persulfate, ammonium peroxide and the like; so-called redox initiators formed of above peroxides in combination with reducing agents such as sodium hydrogensulfite, sodium thiosulfate, Rongalit, ascorbic acid and the like; and azo compounds such as 2,2'-azobisisobutyronitrile, 4,4'-azobis (4-cyanopentanoic acid), 2,2'-azobis[2-methyl-N-(2-hydroxyethyl)-propionamide] and the like can be named. Of those, azo compounds are particularly preferred.

Of those azo compounds, particularly those which are difficultly water-soluble, having a solubility in 25° C. water not higher than 3 mass %, are preferred. Specific examples of such azo compounds include 2,2'-azobisisobutyronitrile, 2,2'-azobis-2-methylbutyronitrile, 2,2'-azobis-2,4-dimethylvaleronitrile, 1,1'-azobis(1-cyclohexane-1-carbonitrile), 2,2'-azobis[2-methyl-N-(2-hydroxyethyl)-propionamide], 2,2'-azobis[2-(2-imidazolin-2-yl)propane] and dimethyl-2,2'-azobisisobutyrate. In particular, 2,2'-azobisisobutyronitrile, 2,2'-azobis[2-(2-imidazolin-2-yl)propane] and dimethyl-2, 2'-azobisisobutyrate are preferred.

Above difficultly water-soluble azo compounds are preferred for giving higher molecular weight to the water-dispersible acrylic polymer particles, as the radical supply into the micelles efficiently progresses.

Suitable use ratio of the radical polymerization initiator is, based on the total mass of the solid content of the polymerizable unsaturated monomers forming the water-dispersible acrylic polymer particles, within a range of normally 0.01-5.0 mass %, preferably 0.01-3.0 mass %, inter alia, 0.01-1.0 mass %.

The adequate concentration of total-polymerizable unsaturated monomers during the emulsion polymerization reaction is normally within a range of 0.1-60 mass %, in particular, 0.5-50 mass %, inter alia, 1.0-50 mass %.

The reaction temperature in the occasion of the emulsion polymerization differs depending on the kind of radical polymerization initiator used, while it can be normally within a range of 40-100° C., preferably 50-90° C., inter alia, 60-80° C. Also the reaction time can be normally 3-24 hours, preferably 5-20 hours, inter alia, 7-16 hours.

The water-dispersible acrylic polymer particles (B) can take either of ordinary homogeneous structure or multilayered structure such as core/shell structure.

The core/shell structured water-dispersible acrylic polymer particles can be obtained by, for example, first emulsion polymerizing the polymerizable unsaturated monomeric component containing no or little carboxyl-containing polymerizable unsaturated monomer (M-1), thereafter adding the polymerizable unsaturated monomeric component containing a large amount of the carboxyl-containing polymerizable unsaturated monomers (M-1), and continuing the emulsion polymerization.

Linkage of the core part and shell part can be effected, for example, by copolymerizing the polymerizable unsaturated bonds derived from allyl acrylate, allyl methacrylate or the like, which are remaining on the surface of the core part, with the polymerizable unsaturated monomeric component containing carboxyl-containing polymerizable unsaturated monomer (M-1).

The water-dispersible acrylic polymer particles (B) can have a hydroxyl value within a range of generally 0-150 mgKOH/g, preferably 5-100 mgKOH/g, inter alia, 10-50 mgKOH/g, from the viewpoint of water resistance and hardenability of resulting coating film.

The water-dispersible acrylic polymer particles (B) also can have an acid value within a range of generally 0.1-100 mgKOH/g, preferably 0.5-50 mgKOH/g, inter alia, 1-35 mgKOH/g, from the viewpoint of storage stability or water resistance of resulting coating film.

Furthermore, the water-dispersible acrylic polymer particles (B) can have an average particle size within a range of generally 10-500 nm, preferably 20-300 nm, inter alia, 40-200 nm, from the viewpoint of dispersion stability of the particles and smoothness of resulting coating film.

In the present specification, the average particle size of the water-dispersible acrylic polymer particles (B) is a value measured with a submicron particle size distribution measuring device at 20° C., after diluting individual sample with deionized water according to the accepted practice. As the submicron particle size distribution measuring device, for example, COULTER N4 Model (tradename, Beckman Coulter, Inc.) can be used.

From the viewpoint of storage stability or performance of resulting coating film such as chipping resistance and water resistance, the water-dispersible acrylic polymer particles (B) can have a weight-average molecular weight of at least 1,100, 000, in particular, within a range of generally 1,100,000-10, 000,000, preferably 1,200,000-5,000,000, inter alia, 1,300,000-4,000,000, from the viewpoint of compatibility with coated surface smoothness.

The weight-average molecular weight of water-dispersible acrylic polymer particles (B) can be measured by static light-scattering method. Specifically, it can be determined by using a multi-angle light-scattering detector and making Zimm plot(s) or the like or, according to SEC-MALLS method in which size-exclusion chromatograph is connected to a multi-angle light-scattering detector, drawing Debye plot and the like.

In the present specification, the weight-average molecular weight of the water-dispersible acrylic polymer particles (B) is a value obtained by measuring the weight-average molecular weight according to above SEC-MALLS method.

Generally in molecular weight measurements by light-scattering method, the following fundamental equation of light-scattering is used:

$$Kc/R(\theta)=1/M_w P(\theta)+2A_2 c+ \quad (1)$$

$R(\theta)$=reducing strength of scattered light (Rayleigh coefficient) at angle $\theta$,
c=sample concentration
Mw=weight-average molecular weight
$A_2$=second virial coefficient
K=optical parameter
$P(\theta)$=angular scattering function.

Whereas, the weight-average molecular weight in the present specification is a value calculated from the equation (1) in which the second and subsequent terms which are the products of second virial coefficient multiplied by the sample concentration are ignored, similar to the SEC-MALLS method in which size-exclusion chromatograph is connected to a multi-angle light-scattering detector.

Inclusive of the measurements in the later-appearing Production Examples, in the present specification DAWN DSP Laser Photometer (Wyatt Technology Corporation) was used as the detector, and as the columns three columns in total of two KF-806L and one KF-802 (tradename, Shodex Co.) were used, and the measurement was conducted under the conditions of: the solvent: tetrahydrofuran, measuring temperature: 40° C., flow rate: 1 cc/min., and sample concentration: 0.1 wt %.

The samples were prepared by drying emulsions of the water-dispersible acrylic polymer particles (B) at ambient temperature, preparing their 2.5 wt % tetrahydrofuran solutions and dissolving them at room temperature for 2 hours. At the time of measurement, each sample was further diluted to 0.1 wt % with tetrahydrofuran, filtered with a membrane filter of 1 μm in pore size to be removed of dust and agglomerate, and used as the specimen to be measured.

The water-dispersible acrylic polymer particles (B) are preferably neutralized with basic compound. As the neutralizer for the water-dispersible acrylic polymer particles (B), ammonia or water-soluble amino compound, for example, monoethanolamine, ethylamine, dimethylamine, diethylamine, triethylamine, propylamine, dipropylamine, isopropylamine, diisopropylamine, triethanolamine, butylamine, dibutylamine, 2-ethylhexylamine, ethylenediamine, propylenediamine, methylethanolamine, dimethylethanolamine, diethylethanolamine, 2-amino-2-methylpropanol, diethanolamine, morpholine and the like can be conveniently used.

Hardening Agent (C)

The hardening agent (C) is not particularly limited and, for example, hereafter named melamine resins and blocked polyisocyanate compounds can be conveniently used. Those hardening agents can be used either alone or in combination of two or more.

Examples of the melamine resin include methylolmelamines such as dimethylolmelamine, trimethylolmelamine, tetramethylolmelamine, pentamethylolmelamine and hexamethylolmelamine; alkyletherified products of methylolmelamines with alcohols; and etherified products of methylolmelamine condensates with alcohols. As the alcohols, for example, $C_{1-10}$ alkanols such as methyl alcohol, ethyl alcohol, propyl alcohol, isopropyl alcohol, butyl alcohol, isobutyl alcohol, 2-ethylhexyl alcohol and the like can be used.

As the melamine resin, for example, melamine resin having at least three methyletherified methylol groups per one triazine nucleus on the average; hydrophilic imino group-containing alkyletherified melamine resin having a weight-average molecular weight of about 500-about 1,000; and the like can be conveniently used.

As the melamine resin, those available on the market can also be used. As such, for example, CYMEL 303, CYMEL 323, CYMEL 325, CYMEL 327, CYMEL 350, CYMEL 370, CYMEL 380, CYMEL 385, CYMEL 212, CYMEL 253, and CYMEL 254 (tradename, Nippon Cytec Industries, Inc.); REGIMIN 735, REGIMIN 740, REGIMIN 741, REGIMIN 745, REGIMIN 746 and REGIMIN 747 (tradename, Monsanto Chemical Co.); SUMIMAL M55, SUMIMAL M30W and SUMIMAL M50W (tradename, Sumitomo Chemical Co., Ltd.); U-VAN20SE (tradename, Mitsui Chemicals Inc.); and the like can be named.

Furthermore, when melamine resin is used as the hardening agent, sulfonic acid such as paratoluenesulfonic acid, dodecylbenzenesulfonic acid and dinonylnaphthalenesulfonic acid; neutralized salt of the sulfonic acid with amine; and neutralized salt of phosphoric acid ester compound with amine; and the like can be used as hardening catalyst.

Blocked polyisocyanate compound is a polyisocyanate compound having at least two isocyanate groups per molecule, whose isocyanate groups are blocked with a blocking agent.

As the polyisocyanate compounds, for example, aliphatic polyisocyanate, alicyclic polyisocyanate, aromatic-aliphatic polyisocyanate, aromatic polyisocyanate and derivatives of these polyisocyanates can be named.

Examples of the aliphatic polyisocyanate include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanatomethyl caproate and the like; and aliphatic triisocyanates such as lysine ester triisocyanate, 1,4,8-triisocyanatooctane, 1,6,11-triisocyanatoundecane, 1,8-diisocyanato-4-isocyanatomethyloctane, 1,3,6-triisocyanatohexane, 2,5,7-trimethyl-1,8-diisocyanato-5-isocyanatomethyloctane and the like.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, norbornane diisocyanate and the like; and alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)

heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1) heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane and the like.

Examples of the aromatic-aliphatic polyisocyanate include aromatic-aliphatic diisocyanates such as 1,3- or 1,4-xylylene diisocyanate or mixtures thereof, ω,ω'-diisocyanato-1,4-diethylbenzene, 1,3- or 1,4-bis(1-isocyanato-1-methylethyl)benzene (common name: tetramethylxylylene diisocyanate) or mixtures thereof; and aromatic-aliphatic triisocyanates such as 1,3,5-triisocyanatomethylbenzene and the like.

Examples of the aromatic polyisocyanate include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, 4,4'-diphenylether diisocyanate and the like; aromatic triisocyanates such as triphenylmethane-4,4',4''-triisocyanate, 1,3,5-triisocyanatobenzene, 2,4,6-triisocyanatotoluene and the like; and aromatic tetraisocyanates such as diphenylmethane-2,2',5,5'-tetraisocyanate and the like.

Also as the polyisocyanate derivatives, for example, dimers, trimers, biurets, allophanates, carbodiimides, urethodiones, urethoimines, isocyanurates, oxadiazintrione, polymethylene polyphenyl polyisocyanate (crude MDI, polymeric MDI), crude TDI and the like of above-named polyisocyanate compounds can be named.

The blocking agent is to block free isocyanate groups. When the blocked polyisocyanate compound is heated to, for example, at least 100° C., preferably at least 130° C., the blocking agent dissociates to regenerate the isocyanate groups which can readily react with hydroxyl groups. Examples of the blocking agent include phenolic compounds such as phenol, cresol, xylenol, nitrophenol, ethylphenol, hydroxydiphenyl, butylphenol, isopropylphenol, nonylphenol, octylphenol, methyl hydroxybenzoate and the like; lactams such as ε-caprolactam, δ-valerolactam, γ-butyrolactam, β-propiolactam and the like; aliphatic alcoholic compounds such as methanol, ethanol, propyl alcohol, butyl alcohol, amyl alcohol, lauryl alcohol and the like; ether compounds such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolic acid esters such as methyl glycolate, ethyl glycolate, butyl glycolate and the like; lactic acid; lactic acid esters such as methyl lactate, ethyl lactate, butyl lactate and the like; alcoholic compounds such as methylolurea, methylolmelamine, diacetone alcohol, 2-hydroxyethyl acrylate, 2-hydroxyethyl methacrylate and the like; oxime compounds such as formamidoxime, acetamidoxime, acetoxime, methyl ethyl ketoxime, diacetylmonooxime, benzophenone-oxime, cyclohexane-oxime and the like; active methylene compounds such as dimethyl malonate, diethyl malonate, ethyl acetoacetate, methyl acetoacetate, acetylacetone and the like; mercaptan compounds such as butyl mercaptan, t-butyl mercaptan, hexyl mercaptan, t-dodecyl mercaptan, 2-mercaptobenzothiazole, thiophenol, methylthiophenol, ethylthiophenol and the like; acid amide compounds such as acetanilide, acetanisidide, acetotoluide, acrylamide, methacrylamide, acetic acid amide, stearic acid amide, benzamide and the like; imide compounds such as succinimide, phathalimide, maleimide and the like; amine compounds such as diphenylamine, phenylnaphthylamine, xylidine, N-phenylxylidine, carbazole, aniline, naphthylamine, butylamine, dibutylamine, butylphenylamine and the like; imidazole compounds such as imidazole, 2-ethylimidazole and the like; pyrazoles such as 3,5-dimethylpyrazole; urea compounds such as urea, thiourea, ethyleneurea, ethylenethiourea, diphenylurea and the like; carbamic acid ester compounds such as phenyl N-phenylcarbamate; imine compounds such as ethyleneimine, propyleneimine and the like; and sulfite compounds such as sodium disulfite, potassium disulfite and the like.

When blocked polyisocyanate compound is used as the hardening agent, for example, organotin compound may be used as the hardening catalyst.

Water-Based Paint Composition

The respective contents of the polyester resin (A), water-dispersible acrylic polymer particles (B), and hardening agent (C) in the water-based paint composition of the present invention are as follows, based on the total solid content of the components (A), (B) and (C), as non-volatile matter: that of the polyester resin (A) is generally within a range of 1-90 mass %, preferably 3-80 mass %, inter alia, 5-70 mass %; that of the water-dispersible acrylic polymer particles (B) is generally within a range of 1-80 mass %, preferably 3-70 mass %, inter alia, 5-60 mass %; and that of the hardening agent is generally within a range of 5-60 mass %, preferably 7.5-50 mass %, inter alia, 10-40 mass %.

Where necessary, pigment may be blended in the water-based paint composition of the present invention. As the pigment, for example, coloring pigment such as titanium dioxide, zinc flower, Carbon Black, Phthalocyanine Blue, Prussian Blue, Cobalt Blue, azo pigment, phthalocyanine pigment, quinacridone pigment, isoindoline pigment, vat pigment and perylene pigment; extenders such as talc, clay, kaoline, baryta, barium sulfate, barium carbonate, calcium carbonate, silica and alumina white; and effect pigment such as aluminum powder, mica powder, titanium dioxide-coated mica powder and the like can be conveniently used.

An adequate blend ratio of such pigment(s) is, per 100 mass parts of the combined solid content of the components (A), (B) and (C), within a range of generally 0-250 mass parts, in particular, 3-150 mass parts.

It is also possible to add to the water-based paint composition of the present invention, where necessary, various resins such as acrylic resin other than the component (B), silicone resin, fluorine-containing resin and the like. Furthermore, where necessary, such common paint additives as hardening catalyst, dispersing agent, antisettling agent, thickener, organic solvent, UV absorber, light stabilizer, antioxidant, surface regulating agent, defoaming agent and the like may also be blended with the water-based paint composition of the invention.

The water-based paint composition of the invention can be prepared, for example, by intimately mixing the above-described components in an aqueous medium with the water-based paint composition of the invention.

The water-based paint composition of the present invention can form coating film of excellent finished appearance such as coated surface smoothness and superior performance such as chipping resistance, water resistance and the like, and therefore can be conveniently used as, for example, intermediate paint for automobiles.

Application of the water-based paint composition of the present invention can be carried out by per se known means, for example, air spray coating, airless spray coating, rotary atomizing coating, curtain coat flow coating or the like. Where necessary, static electricity may be applied in these coating means. As the coating means, particularly rotary atomizing coating under electrostatic impression is preferred. The coating can be carried out all at once or dividedly in plural times, until the desired film thickness is obtained. Preferred film thickness is, in terms of hardened coating film, normally within a range of 3-100 µm, in particular, 5-60 µm. The coating film can be hardened by heating at about 120-about 170° C., in particular, about 130-about 160° C., for around 10-40 minutes. The heat-hardening can be effected with per se known heating means, such as drying oven, e.g., hot air oven, electric oven, infrared ray induction furnace, and the like. Where necessary, preheating at temperatures of about 50-about 80° C. for around 3-10 minutes may be conducted preceding the heat-hardening, for promoting volatilization of volatile component such as the solvent.

The coating object which can be coated with the water-based paint composition of the present invention is subject to no particular limitation and, for example, sheet steel such as cold-rolled sheet steel, zinc-plated sheet steel, zinc alloy-plated sheet steel, stainless steel sheet and tin-plated sheet steel; metal substrates such as aluminum plate and aluminum alloy plate; and various plastic materials are preferred. They may also be bodies of various vehicles such as automobiles, two-wheeled vehicles and container cars formed thereof.

The coating objects may also be metallic surfaces of metal substrates or of the vehicle bodies, which have been given a surface treatment such as phosphate treatment, chromate treatment or complex oxide treatment.

These coating objects may also be those which are advancedly applied with undercoating (e.g., cationic electrocoating).

The water-based paint composition of the present invention can be applied, as mixed with additives or the like which are added in the occasion of use where necessary and diluted by addition of water and/or organic solvent, where necessary, to be adjusted to have an adequate viscosity.

The adequate viscosity differs depending on composition of the paint. Whereas, when the viscosity is adjusted with Ford cup viscosimeter No. 4, it is normally within a range of about 20-about 60 seconds, preferably about 25-about 50 seconds, at 20° C. The solid coating concentration of the present paint is normally within a range of about 5-about 65 mass %, preferably about 10-about 45 mass %.

Multilayer Coating Film-Forming Method

The present invention also provides a multilayer coating film-forming method, which comprises applying onto a coating object intermediate paint and top paint successively, characterized in that the above-described water-based paint composition is used as the intermediate paint.

As the coating object, above-described materials can be named, and onto such a coating object, normally an undercoat is applied with cationic electrocoating paint or the like in advance, preceding the application of the intermediate paint.

As the cationic electrocoating paint, for example, those known per se which are usually used as primer in coating metallic substrate can be used. Specifically, water-based paint formed by blending with basic water-soluble or water-dispersible resin which can be solubilized or dispersed in water as neutralized with organic acid or inorganic acid, e.g., epoxy, acrylic or polybutadiene resins having many amino groups in their resinous skeletons, a neutralizer, pigment (coloring pigment, extender, rust-proofing pigment and the like), hydrophilic solvent and water, and further where necessary, hardening agent and additive(s), can be used. As the neutralizer for solubilizing or dispersing the basic water-soluble or water-dispersible resin in water, for example, organic acid such as acetic acid, hydroxyacetic acid, propionic acid, butyric acid, lactic acid, glycine and the like; or inorganic acid such as sulfuric acid, hydrochloric acid, phosphoric acid and the like can be used. Adequate use rate of these neutralizers is such that the neutralization equivalent to the amine value of the resin (normally within a range of about 30-about 200 mgKOH/g) should fall within a range of about 0.1-about 1.

The cationic electrocoating paint is diluted with deionized water to the solid content within a range of normally 5-40 mass %, preferably 8-30 mass %, formed into an electrocoating bath having a pH within a range of 5.5-8.0, and can be used for cationic electrocoating the coating object following the accepted practice. Preferred thickness of so formed electrocoating film normally ranges about 10-about 40 µm, in particular, about 15-about 30 µm, in terms of hardened film. So formed cationic electrocoating film can be hardened by heating at about 140-about 210° C., preferably at about 160-about 180° C., for around 10-40 minutes.

Then the water-based intermediate paint composition of the present invention is applied onto the coating object as the intermediate paint.

Application and heat-hardening of the water-based paint composition of the present invention as an intermediate paint can be carried out by the means similar to those described in the above.

Onto the intermediate coating film formed of the water-based paint composition of the present invention, then top paint is applied. As top paint, those known per se can be used. Specifically, for example, liquid paint of acrylic resin/amino resin type, alkyd resin/amino resin type, polyester resin/amino resin type or acid resin/epoxy resin type can be used. These liquid paints may be either organic solvent-based or water-based.

These top paints can take any form of colored paint blended with coloring pigment, metallic paint blended with metallic pigment, and clear paint containing none or little of these pigments. According to the present method, these paints are suitably used to form the top coating film in 1-coat system (1C1B), 2-coat system (2C1B, 2C2B) and the like.

Specifically, for example, solid color finish by 1-coat system comprising applying a colored paint onto the heat-hardened intermediate coating film to the hardened film thickness of about 10-about 40 µm, and preheating the same film, where necessary, at a temperature of about 50-about 80° C. for around 3-10 minutes, followed by heating at about 100-about 160° C. for 10-40 minutes; solid color or metallic finish by 2-coat-1-bake system (2C1B) or 2-coat-2-bake system (2C2B) which comprises applying a colored paint or metallic paint onto the heat-hardened intermediate coating film to the hardened film thickness of about 10-about 30 µm, preheating the same film, where necessary, at a temperature of about 50-about 80° C. for 3-10 minutes, applying a clear paint onto heat-hardened or unhardened coating film to the hardened film thickness of about 20-about 60 µm, and where necessary pre-heating the applied film at a temperature of about 50-about 80° C. for around 3-10 minutes, followed by heating at a temperature of about 100-about 160° C. for 10-40 minutes; can be carried out.

According to the present invention, furthermore, a multilayer coating film-forming method is provided, which is characterized by comprising applying onto a coating object a water-based paint composition of the present invention as the intermediate paint, applying onto the unhardened coated surface a water-based base coat paint, further applying onto the unhardened coated surface a clear coat paint, and hardening the three-layered coating film formed of the intermediate coat, base coat and clear coat simultaneously.

As the water-based base coat and clear coat which are the top paints used in the above, those per se known top paints as above-described can be used.

Specifically, this multilayer coating film-forming method characterized by the simultaneous hardening of the three-layered coating film of the intermediate coat, base coat and clear coat can be carried out, for example, as follows: applying a paint composition of the present invention as the intermediate paint to a hardened film thickness of about 10-about 50 μm, preferably about 20-about 40 μm; preheating the same, where necessary, at about 50-about 80° C. for around 3-10 minutes; then applying onto the unhardened coated surface a water-based coat paint to a hardened film thickness of about 10-about 30 μm, preferably about 10-about 20 μm; where necessary, carrying out a preheating at about 50-about 80° C. for around 3-10 minutes; further applying onto the unhardened coated surface a clear coat paint to a hardened film thickness of about 20-about 60 μm, preferably about 30-about 50 μm; where necessary, carrying out a preheating at about 50-about 80° C. for around 3-10 minutes; and thereafter simultaneously hardening this three-layered coating film by heating at about 100-about 160° C. for 10-40 minutes.

EXAMPLES

Hereinafter the invention is explained more specifically, referring to working Examples and Comparative Examples, it being understood that the invention is not limited to the following Examples only. "Part" and "%" appearing hereafter are by mass, and thickness of coating film is always based on that of hardened film.

Production of Polyester Resin (A)

Production Examples 1-18

A 4-necked flask equipped with a heater, stirrer, thermometer, reflux condenser and rectification column was charged with the acid component and alcoholic component at the mol ratios as indicated in the later appearing Table 1, and the temperature of the reaction system was raised to 160° C. Then the temperature was raised from 160° C. to 230° C. over 3 hours, while distilling off the formed water of condensation through the rectification column, followed by 2 hours' reaction at 230° C.

Then the rectification column was replaced with a water separator, toluene was suitably added, and the refluxing condition was maintained at 230° C. to effect the condensation reaction while separating and distilling off the water of condensation with the water separator.

At the timepoint when the resin acid value reached 7, toluene was removed under reduced pressure, and the reaction mixture was cooled to 170° C. To the reaction product trimellitic anhydride was added at the mol ratios as indicated in Table 1, followed by the addition reaction at 170° C. for 60 minutes. Thereafter 10% to the reaction product of propylene glycol monomethyl ether was added, the temperature was lowered to 85° C., and the reaction product was neutralized with N,N-dimethylethanolamine. Further deionized water was gradually added to make the product into an aqueous dispersion, whereupon providing polyester resins (A) each having a solid content of 45% (with pH adjusted to 8.5 in all cases). The acid values, hydroxyl values and number-average molecular weights of the resultant polyester resins (A) are concurrently shown in the following Table 1.

TABLE 1

| | | Production Example | | | | | |
|---|---|---|---|---|---|---|---|
| | | 1 | 2 | 3 | 4 | 5 | 6 |
| Polyester resin (A-) | | 1 | 2 | 3 | 4 | 5 | 6 |
| Acid Component | 1,2-cyclohexanedicarboxylic anhydride | 0.75 | 0.85 | | 0.53 | 0.27 | 0.53 |
| | 1,4-cyclohexanedicarboxylic acid | | | 0.55 | | | |
| | phthalic anhydride | | | | | | |
| | dodecanedioic acid | 0.1 | | 0.1 | | | |
| | adipic acid | | | 0.2 | 0.32 | 0.58 | 0.32 |
| Alcoholic Component | trimethylolpropane | 0.3 | 0.3 | 0.35 | 0.4 | 0.35 | 0.2 |
| | trimethylolethane | | | | | | |
| | 1,3-propanediol | 0.7 | | 0.35 | | | |
| | 1,6-hexanediol | | 0.7 | | | | |
| | neopentyl glycol | | | 0.3 | | | |
| | 2-butyl-2-ethyl-1,3-propanediol | | | | 0.6 | 0.65 | 0.8 |
| | dimethylolpropionic acid | | | | | | |
| | dimethylolbutanoic acid | | | | | | |
| trimellitic anhydride (additive acid, acid component) | | 0.024 | 0.028 | 0.026 | 0.028 | 0.028 | 0.028 |
| DBR | | 0.85 | 0.85 | 0.85 | 0.85 | 0.85 | 0.85 |
| mol % of (a-1) in the acid component | | 86 | 97 | 63 | 60 | 31 | 60 |
| hydroxyl value (mgKOH/g) | | 152 | 138 | 153 | 150 | 142 | 105 |
| acid value (mgKOH/g) | | 19 | 19 | 19 | 19 | 19 | 19 |
| number-average molecular weight | | 1200 | 1400 | 1300 | 1400 | 1400 | 1500 |

| | | Production Example | | | | | |
|---|---|---|---|---|---|---|---|
| | | 7 | 8 | 9 | 10 | 11 | 12 |
| Polyester resin (A-) | | 7 | 8 | 9 | 10 | 11 | 12 |
| Acid Component | 1,2-cyclohexanedicarboxylic anhydride | 0.55 | 0.55 | 0.55 | 0.53 | 0.53 | 0.52 |
| | 1,4-cyclohexanedicarboxylic acid | | | | | | |
| | phthalic anhydride | | | | | | |
| | dodecanedioic acid | | | | | | |
| | adipic acid | 0.25 | 0.3 | 0.3 | 0.32 | 0.3 | 0.3 |

TABLE 1-continued

| | | | | | | | |
|---|---|---|---|---|---|---|---|
| Alcoholic Component | trimethylolpropane | 0.45 | 0.4 | 0.4 | | 0.4 | 0.4 |
| | trimethylolethane | | | | 0.39 | | |
| | 1,3-propanediol | | | | | | |
| | 1,6-hexanediol | | | | | | |
| | neopentyl glycol | 0.15 | | | | | |
| | 2-butyl-2-ethyl-1,3-propanediol | 0.4 | 0.6 | 0.6 | 0.61 | 0.58 | 0.55 |
| | dimethylolpropionic acid | | | | | 0.02 | |
| | dimethylolbutanoic acid | | | | | | 0.05 |
| trimellitic anhydride (additive acid, acid component) | | 0.02 | 0.0165 | 0.065 | 0.028 | 0.028 | 0.028 |
| DBR | | 0.8 | 0.85 | 0.85 | 0.85 | 0.83 | 0.82 |
| mol % of (a-1) in the acid component | | 67 | 63 | 60 | 60 | 62 | 61 |
| hydroxyl value (mgKOH/g) | | 195 | 151 | 138 | 150 | 156 | 155 |
| acid value (mgKOH/g) | | 16 | 12 | 33 | 19 | 19 | 19 |
| number-average molecular weight | | 1000 | 1500 | 1500 | 1400 | 1400 | 1600 |

| | | Production Example | | | | | |
|---|---|---|---|---|---|---|---|
| | | 13 | 14 | 15 | 16 | 17 | 18 |
| Polyester resin (A-) | | 13 | 14 | 15 | 16 | 17 | 18 |
| Acid Component | 1,2-cyclohexanedicarboxylic anhydride | 0.23 | | 0.53 | 0.53 | 0.53 | 0.53 |
| | 1,4-cyclohexanedicarboxylic acid | | | | | | |
| | phthalic anhydride | | 0.32 | | | | |
| | dodecanedioic acid | | | | | | |
| | adipic acid | 0.64 | 0.55 | 0.3 | 0.21 | 0.32 | 0.32 |
| Alcoholic Component | trimethylolpropane | 0.28 | 0.3 | 0.11 | 0.4 | 0.4 | 0.4 |
| | trimethylolethane | | | | | | |
| | 1,3-propanediol | 0.72 | 0.3 | | | | |
| | 1,6-hexanediol | | | | | | |
| | neopentyl glycol | | 0.4 | | | | |
| | 2-butyl-2-ethyl-1,3-propanediol | | | 0.89 | 0.6 | 0.6 | 0.6 |
| | dimethylolpropionic acid | | | | | | |
| | dimethylolbutanoic acid | | | | | | |
| trimellitic anhydride (additive acid, acid component) | | 0.021 | 0.023 | 0.028 | 0.028 | 0.002 | 0.075 |
| DBR | | 0.87 | 0.87 | 0.83 | 0.74 | 0.85 | 0.85 |
| mol % of (a-1) in the acid component | | 26 | 0 | 62 | 69 | 62 | 57 |
| hydroxyl value (mgKOH/g) | | 153 | 149 | 95 | 206 | 158 | 135 |
| acid value (mgKOH/g) | | 19 | 19 | 18 | 19 | 8 | 37 |
| number-average molecular weight | | 1300 | 1400 | 1300 | 900 | 1400 | 1500 |

Production of Water-Dispersible Acrylic Polymer Particles (B)

Production Example 19

A reactor equipped with a thermometer, thermostat, stirrer, reflux condenser and a dropping device was charged with 82 parts of deionized water and 1.0 part of ADEKARIASOAP SR-1025(note 1), mixed by stirring in gaseous nitrogen current, and the temperature was raised to 75° C. Then 3% of the total amount of an emulsion(note 2) of the specified monomers and the initiator and 10 parts of 0.5% aqueous ammonium persulfate solution were introduced into the reactor and maintained at 75° C. for 2 hours. Thereafter the remainder of the monomer-initiator emulsion was dropped into the reactor over 5 hours, and aged for 6 hours after completion of the dropping. Then the reaction mixture was cooled to 30° C. and adjusted to have a solid content of 40% and pH of 6.8, with 5.0% aqueous dimethylethanolamine solution and deionized water, followed by discharge under filtration with 200-mesh Nylon cloth, to provide water-dispersible acrylic polymer particles 1 (solid content 40%) having an average particle size of 140 nm (measured as diluted with deionized water, at 20° C., with Sub-micron Particle Size Distribution-measuring Apparatus, COULTER N4 Model, Beckman Coulter, Inc.), an acid value of 11 mgKOH/g and hydroxyl value of 24 mgKOH/g.

(Note 1) ADEKARIASOAP SR-1025: tradename, ADEKA Corporation, an ammonium salt of α-sulfo-ω-(1-(alkoxy)methyl-2-(2-propenyloxy)ethoxy)-poly(oxy-1,2-ethan-di-yl), active ingredient: 25%

(Note 2) monomer-initiator emulsion: a monomer-initiator emulsion obtained by mixing and stirring 55 parts of deionized water, 4 parts of LATEMUL E-118B (tradename, KAO Corporation, sodium polyoxyethylene alkyl ether sulfate, active ingredient: 26%), 10 parts of styrene, 53.5 parts of methyl methacrylate, 30 parts of n-butyl acrylate, 5 parts of 2-hydroxyethyl acrylate, 1.5 parts of acrylic acid and 0.2 part of 2,2'-azobis[2-(2-imidazolin-2-yl)propane].

Production Examples 20-23

Production Example 19 was repeated except that the composition of the monomer-initiator emulsion was changed as indicated in the following Table 2, to provide water-dispersible acrylic polymer particles 2-5. In Production Examples 21-23, however, 2,2'-azobis[2-(2-imidazolin-2-yl)propane] in above (note 2) was replaced with ammonium persulfate, as the initiator.

The solid contents, acid values and hydroxyl values of thus obtained water-dispersible acrylic polymer particles 2-5 are shown in the following Table 2, concurrently with the solid content, acid value and hydroxyl value of the water-dispersible acrylic polymer particles 1 which were obtained in Production Example 19.

TABLE 2

| Production Example | | 19 | 20 | 21 | 22 | 23 |
|---|---|---|---|---|---|---|
| Water-dispersible acrylic polymer particles | | 1 | 2 | 3 | 4 | 5 |
| Deionized water | | | | 82 | | |
| ADEKARIASOAP SR-1025 (note 1) | | | | 1.0 | | |
| 0.5% aqueous ammonium persulfate solution | | | | 10 | | |
| Monomeric | deionized water | | | 55 | | |
| emulsion | styrene | 10 | 10 | 10 | 10 | 10 |
| | methyl methacrylate | 53 | 53 | 51.5 | 53.5 | 53.5 |
| | n-butyl acrylate | 30 | 30 | 30 | 30 | 30 |
| | 2-hydroxyethyl acrylate | | | 5 | 5 | 5 |
| | 2-hydroxyethyl methacrylate | 5 | 5 | | | |
| | methacrylic acid | 2 | 2 | | | |
| | acrylic acid | | | 1.5 | 1.5 | 1.5 |
| | 1,6-hexanediol diacrylate | | | 2 | | |
| | n-octyl-3-mercaptopropionate | | | | | 0.3 |
| | LATEMUL E-118B | 4 | 2 | 4 | 4 | 4 |
| | ADEKARIASOAP ER-40 (note 3) | | 8 | | | |
| 2,2'-Azobis[2-(2-imidazolin-2-yl)propane] | | 0.2 | 0.2 | | | |
| Ammonium persulfate | | | | 0.5 | 0.25 | 0.5 |
| Reaction temp. (° C.) | | | 75 | | 85 | |
| Weight-average molecular weight (ten-thousands) | | 290 | 300 | 1000< | 50 | 9 |
| Absorbance | | 0.08 | 0.05 | 1.5 | 0.35 | 0.05 |
| Average particle size (nm) | | 142 | 135 | 116 | 130 | 128 |
| Acid value (mgKOH/g) | | 13 | 13 | 11 | 11 | 11 |
| Hydroxyl value (mgKOH/g) | | 21.6 | 21.6 | 24 | 24 | 24 |
| Solid content (wt %) | | 40 | 40 | 40 | 40 | 40 |

(Note 3) ADEKARIASOAP ER-40: tradename ADEKA Corporation, α-hydro-ω-(1-(alkoxy)methyl-2-(2-propenyloxy)-ethoxy)-poly(oxy-1,2-ethan-di-yl), active ingredient: 60%

Production of Resin 1 for Pigment-Dispersed Paste

Production Example 24

A 4-necked flask equipped with a heater, stirrer, thermometer, reflux condenser and rectification column was charged with 274 parts of CARDURA E10P (tradename, Japan Epoxy Resin Co., Ltd., neodecanoic acid monoglycidyl ester), 382 parts of trimethylolpropane, 650 parts of phthalic anhydride, 350 parts of adipic acid and 486 parts of 1,6-hexanediol, and the temperature in the flask was raised to 160° C. Then the temperature was raised from 160° C. to 230° C. over 3 hours, while distilling off the formed water of condensation through the rectification column, followed by 2 hours' reaction at 230° C. The rectification column was replaced with a water separator, a suitable amount of toluene was added, and the refluxing condition was maintained at 230° C. While separating and distilling off the water of condensation with the water separator, the condensation reaction was continued until the resin's acid value dropped to not higher than 2. Then the toluene was distilled off under reduced pressure, and the reaction mixture was cooled to 170° C., to which 127.4 parts of trimellitic anhydride was added and the addition reaction was carried out at 170° C. for 30 minutes. Ten (10) mass % to the reaction product of propylene glycol monopropyl ether was added to lower the temperature to 85° C., followed by neutralization with N,N-dimethylethanolamine and gradual addition of deionized water to form an aqueous dispersion. Thus, resin 1 for pigment-dispersed paste having a solid content of 40% was obtained.

The resulting resin 1 for pigment-dispersed paste had an acid value of 35 mgKOH/g, hydroxyl value of 123 mgKOH/g and a number-average molecular weight of 1500.

Production of Water-Based Paint Composition
(Water-Based Intermediate Paint)

Example 1

To 37.5 parts of the resin 1 for pigment-dispersed paste as obtained in Production Example 24, 1 part of CARBON MA100 (Mitsubishi Chemicals, Co., carbon black), 70 parts of JR806 (titanium white, Tayca Corporation) and 10 parts of MICRO ACE S-3 (tradename, Nippon Talc Co., micro-size talc powder) were added by the order stated and mixed, and dispersed in a paint shaker for 30 minutes to obtain pigment-dispersed paste 1.

To 118.5 parts of the resulting pigment-dispersed paste 1, 88.9 parts of the polyester resin (A-1) as obtained in Production Example 1, 50 parts of water-dispersible acrylic polymer particles 1 as obtained in Production Example 19, and 35.7 parts of CYMEL 250 (tradename, Mitsui Cytec Ltd., methoxy-butoxy-mixed alkylated melamine resin, solid content: 70%) were successively added under stirring. Further adding thereto deionized water and dimethylethanolamine to adjust the pH to 8.5 and the viscosity to 40 seconds as measured with Ford cup No. 4 at 20° C., water-based paint composition 1 was obtained.

Examples 2-14 and Comparative Examples 1-10

Water-based paint compositions 2-24 were obtained by mixing with stirring the blends as identified in the following Table 3, in the manner similar to Example 1.

VPLS 2310 in the following Table 3 is a tradename of hexamethylene diisocyanate type methyl ethyl ketoxime-blocked isocyanate (number-average molecular weight: 1,000) manufactured by Sumika Bayer Urethane Co., Ltd.

In the Table, the blended amount of each component in each paint blend is invariably by solid mass.

Thus obtained water-based paint compositions 1-24 were stored at 40° C. for 5 days to examine their storability. The evaluation standard was as follows:

⊙: no viscosity change, no precipitated matter or phase separation was observed, good;

○: minor viscosity change was observed but no precipitated matter or phase separation perceivable;

Δ: precipitation was observed but no phase separation perceivable;

x: precipitation was observed and phase separation occurred.

Preparation of Test Panels 1

Using the water-based paint compositions 1-24 as obtained in Examples 1-14 and Comparative Examples 1-10, test panels of the respective compositions were prepared as follows.

Onto a PARBOND #3020 (tradename, Nippon Parkerizing Co., Ltd., zinc phosphate-treating agent)-treated cold-rolled steel sheet, ELECRON GT-10 (tradename, Kansai Paint Co., cationic electrocoating paint) was electrocoated to a film thickness of 20 μm, which was hardened by heating at 170° C. for 30 minutes.

Onto the electrocoated film, each of the water-based paint compositions 1-24 was applied to a film thickness of 35 μm, hardened by heating at 140° C. for 20 minutes, and onto which a water-based metallic base coat WBC 713 (tradename, Kansai Paint Co., acryl/melamine resin type water-based top coloring base coat paint) whose viscosity was adjusted to 40 seconds as measured with Fold cup No. 4 at 20° C. was applied to a film thickness of 15 μm. After allowing the coated panels to stand at room temperature for 3 minutes, preheating was conducted at 80° C. for 3 minutes. Then an organic solvent-based clear coat paint KINO #1200TW (tradename, Kansai Paint Co., acid/epoxy hardening type acrylic resin-containing clear paint) whose viscosity was adjusted with SWAZOL 1000 (tradename, COSMO OIL Co., Ltd. petroleum-derived aromatic hydrocarbon solvent) to 25 seconds as measured with Ford cup No. 4 at 20° C. was applied to a film thickness of 35 μm. After being left to stand for 7 minutes, the coated panels were heated at 140° C. for 30 minutes to concurrently harden the base coat and clear coat and to provide the test panels.

The following performance tests were given to the above-obtained test panels. The performance test results are also shown in Table 3.

Chipping Resistance:

Each of the test panels was mounted on a test piece support in Suga Test Instruments Co., Ltd.'s gravel chipping test instrument, JA-400 Model (tradename, a chipping test device), and 50 g of crushed granite rock of particle size No. 7 was blown at the coated surface with compressed air of 0.392 MPa (4 kgf/cm$^2$) at −20° C. The extent of thereby incurred damage on the coated film was visually observed and evaluated:

⊙: size of the damage was small and the coated film of the water-based intermediate paint (paint composition of the present invention) was slightly exposed;

○: size of the damage was small and the coating film of the water-based intermediate paint and a part of the electrocoated film were slightly exposed but the substrate was not exposed;

Δ: size of the damage was small but the electrocoated film and substrate steel sheet were slightly exposed;

x: size of the damage was considerably large and the substrate steel sheet was broadly exposed.

Finished appearance: measured with BYK Gardner's Wave Scan (tradename). With the Wave Scan Long Wave value (LW) and Short Wave value (SW) were measured. Long Wave value is an index of amplitude of surface roughness of the wavelength ranging about 1.2-12 mm, and can evaluate the condition of medium wave texture of coated surface. Short Wave value is an index of amplitude of surface roughness of the wavelength ranging about 0.3-1.2 mm, and can evaluate the condition of fine texture of coated surface. As to both of the Wave Scan values, less measured values indicate higher smoothness of the coated surface. By way of a yardstick, generally Wave Scan values less than 15 indicate favorable coated surface smoothness. The indication, "vertical" means that the test panel whose coating was completed was set, pre-dried and heat-hardened in vertical state at 90° angle to the horizontal plane.

Water resistance: The test panels were left standing in a 20° C. thermostatic chamber for 24 hours and thereafter dipped in warm water of 80° C. for 5 hours. Leaving the panels in dipped state and the temperature of the dipping water was gradually cooled from 80° C. to room temperature. The surface condition of the test panels then withdrawn from the water was visually evaluated according to the following criteria:

○: favorable luster;

Δ: inferior in luster but the coated surface was not clouded;

x: inferior in luster and the coated surface was clouded opaque.

TABLE 3

Paint Blend and Performance Test Result

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Water-based paint composition | 1 | 2 | 3 | 4 | 5 | 6 | 7 | 8 | 9 | 10 | 11 | 12 | 13 | 14 |
| Polyester resin (A-1) | 40 | | | | | | | | | | | | | |
| Polyester resin (A-2) | | 40 | | | | | | | | | | | | |
| Polyester resin (A-3) | | | 40 | | | | | | | | | | | |
| Polyester resin (A-4) | | | | 40 | | | | | | | | | 40 | 40 |
| Polyester resin (A-5) | | | | | 40 | | | | | | | | | |
| Polyester resin (A-6) | | | | | | 40 | | | | | | | | |
| Polyester resin (A-7) | | | | | | | 40 | | | | | | | |
| Polyester resin (A-8) | | | | | | | | 40 | | | | | | |
| Polyester resin (A-9) | | | | | | | | | 40 | | | | | |
| Polyester resin (A-10) | | | | | | | | | | 40 | | | | |
| Polyester resin (A-11) | | | | | | | | | | | 40 | | | |
| Polyester resin (A-12) | | | | | | | | | | | | 40 | | |
| Water-dispersible acrylic polymer particles 1 | 20 | 20 | 20 | 20 | 20 | 20 | 20 | 20 | 20 | 20 | 20 | 20 | | 20 |
| Water-dispersible acrylic polymer particles 2 | | | | | | | | | | | | | 20 | |

TABLE 3-continued

Paint Blend and Performance Test Result

| | | | | | | | | | | | | | | |
|---|---|---|---|---|---|---|---|---|---|---|---|---|---|---|
| Resin for pigment-dispersed paste 1 | 15 | 15 | 15 | 15 | 15 | 15 | 15 | 15 | 15 | 15 | 15 | 15 | 15 | 15 |
| CYMEL 250 | 25 | 25 | 25 | 25 | 25 | 25 | 25 | 25 | 25 | 25 | 25 | 25 | 25 | |
| VPLS2310 | | | | | | | | | | | | | | 25 |
| CARBON MA-100 | 1 | 1 | 1 | 1 | 1 | 1 | 1 | 1 | 1 | 1 | 1 | 1 | 1 | 1 |
| JR806 | 70 | 70 | 70 | 70 | 70 | 70 | 70 | 70 | 70 | 70 | 70 | 70 | 70 | 70 |
| MICRO ACE S-3 | 10 | 10 | 10 | 10 | 10 | 10 | 10 | 10 | 10 | 10 | 10 | 10 | 10 | 10 |
| Chipping resistance | ○ | ○ | ⊙ | ⊙ | ⊙ | ○ | ○ | ○ | ⊙ | ⊙ | ⊙ | ⊙ | ⊙ | ⊙ |
| Finishing property (vertical LW) | 9.3 | 8.0 | 8.1 | 7.5 | 7.9 | 8.1 | 9.5 | 9.8 | 9.2 | 9.3 | 7.0 | 7.5 | 8.0 | 7.2 |
| Finishing property (vertical SW) | 14.9 | 14.5 | 13.9 | 13.2 | 13.9 | 14.5 | 14.0 | 13.5 | 13.2 | 11.1 | 10.8 | 11.2 | 13.5 | 12.1 |
| Water resistance | ○ | ○ | ○ | ○ | ○ | ○ | ○ | ○ | ○ | ○ | ○ | ○ | ○ | ○ |
| Paint storability | ○ | ○ | ○ | ○ | ○ | ○ | ○ | ○ | ○ | ○ | ⊙ | ⊙ | ○ | ⊙ |

| | Example | | | | | | | | | |
|---|---|---|---|---|---|---|---|---|---|---|
| | 1 | 2 | 3 | 4 | 5 | 6 | 7 | 8 | 9 | 10 |
| Water-based paint composition | 15 | 16 | 17 | 18 | 19 | 20 | 21 | 22 | 23 | 24 |
| Polyester resin (A-4) | | | | | | | 60 | 40 | 40 | 40 |
| Polyester resin (A-13) | 40 | | | | | | | | | |
| Polyester resin (A-14) | | 40 | | | | | | | | |
| Polyester resin (A-15) | | | 40 | | | | | | | |
| Polyester resin (A-16) | | | | 40 | | | | | | |
| Polyester resin (A-17) | | | | | 40 | | | | | |
| Polyester resin (A-18) | | | | | | 40 | | | | |
| Water-dispersible acrylic polymer particles 1 | 20 | 20 | 20 | 20 | 20 | 20 | | | | |
| Water-dispersible acrylic polymer particles 3 | | | | | | | | 20 | | |
| Water-dispersible acrylic polymer particles 4 | | | | | | | | | 20 | |
| Water-dispersible acrylic polymer particles 5 | | | | | | | | | | 20 |
| Resin for pigment-dispersed paste 1 | 15 | 15 | 15 | 15 | 15 | 15 | 15 | 15 | 15 | 15 |
| CYMEL 250 | 25 | 25 | 25 | 25 | 25 | 25 | 25 | 25 | 25 | 25 |
| CARBON MA-100 | 1 | 1 | 1 | 1 | 1 | 1 | 1 | 1 | 1 | 1 |
| JR806 | 70 | 70 | 70 | 70 | 70 | 70 | 70 | 70 | 70 | 70 |
| MICRO ACE S-3 | 10 | 10 | 10 | 10 | 10 | 10 | 10 | 10 | 10 | 10 |
| Chipping resistance | Δ | X | X | X | X | Δ | X | ○ | Δ | X |
| Finishing property (vertical LW) | 12.8 | 13.8 | 13.6 | 14.9 | 16.8 | 10.5 | 10.8 | 16.0 | 16.5 | 17.2 |
| Finishing property (vertical SW) | 17.8 | 28.8 | 29.6 | 26.1 | 17.1 | 13.8 | 14.5 | 29.0 | 14.0 | 14.0 |
| Water resistance | X | X | X | X | X | X | X | X | ○ | X |
| Paint storability | Δ | Δ | Δ | X | Δ | X | ○ | Δ | X | ○ |

Preparation of Test Panels 2

Example 15 and Comparative Examples 11-13

Using the water-based paint compositions 4, 15, 16 and 21 as obtained in Example 4 and Comparative Examples 1, 2 and 7, test panels of the respective compositions were prepared as follows.

Onto a PARBOND #3020 (tradename, Nippon Parkerizing Co., Ltd., zinc phosphate-treating agent)-treated cold-rolled steel sheet, ELECRON GT-10 (tradename, Kansai Paint Co., cationic electrocoating paint) was electrocoated to a film thickness of 20 μm, which was hardened by heating at 170° C. for 30 minutes.

Onto the electrocoated film, each of the water-based paint compositions, 4, 15, 16 and 21 was applied to the film thickness of 35 μm. Leaving the coated surfaces for 3 minutes and then preheating them at 80° C. for 5 minutes, a water-based metallic base coat WBC 713 (tradename, Kansai Paint Co., an acryl/melamine resin type water-based top coloring base coat paint) whose viscosity was adjusted to 40 seconds as measured with Ford cup No. 4 at 20° C., was applied onto the unhardened coating film of each of the water-based paint composition (water-based intermediate paint), to a film thickness of 15 μm, followed by 3 minutes' standing at room temperature and preheating at 80° C. for 3 minutes.

Then an organic solvent-based clear coat paint KINO #1200 TW (tradename, Kansai Paint Co., acid/epoxy hardening type acrylic resin-based clear paint) whose viscosity was adjusted to 25 seconds as measured with Ford cup No. 4 at 20° C., with SWAZOL 1000 (tradename, COSMO OIL CO., Ltd., petroleum-derived aromatic hydrocarbon solvent) was applied to provide a 35 μm-thick coating film on each of the unhardened water-based metallic base coat coating film. After 7 minutes' standing, the coated objects were heated at 140° C. for 30 minutes to concurrently harden the three-layered coating films to provide the test panels.

The performance test results of so prepared test panels are shown in Table 4. The test methods and methods of evaluation were same to those as given in Preparation of test panels 1.

TABLE 4

| | Performance Test Result | | | |
| --- | --- | --- | --- | --- |
| | Example | Comparative Example | | |
| | 15 | 11 | 12 | 13 |
| Water-based paint composition | 4 | 15 | 16 | 21 |
| Chipping resistance | ⊙ | Δ | X | X |
| Finishing property (vertical LW) | 8.8 | 14.5 | 17.1 | 13.8 |
| Finishing property (vertical SW) | 14.1 | 19.2 | 29.5 | 17.8 |
| Water resistance | ○ | X | X | X |

The invention claimed is:

1. A water-based paint composition comprising polyester resin (A), water-dispersible acrylic polymer particles (B) and hardening agent (C), wherein:
the polyester resin (A) is a polyester resin having a hydroxyl value within a range of 120-180 mgKOH/g and an acid value within a range of 12-30 mgKOH/g, which is obtained by reaction of an acid component and an alcoholic component, wherein an alicyclic polyvalent carboxylic acid (inclusive of an acid anhydride) (a-1) content of the acid component is at least 30 mol % based on a total of the acid component, and the polymer particles (B) have a weight-average molecular weight of at least 1,100,000 and an absorbance not higher than 0.2 at a wavelength of 330 nm as measured with spectrophotometer in a state of a liquid dispersion at a mass concentration of 1.35% in 1,4-dioxane solvent.

2. A water-based paint composition according to claim 1, in which the polyester resin (A) comprises as the alcoholic component a diol (a-2) having branched alkylene group and containing at least 5 carbon atoms, wherein a content of the (a-2) in the alcoholic component is at least 40 mol % based on a total of the alcoholic component.

3. A water-based paint composition according to claim 1, in which the polyester resin (A) comprises as the alcoholic component hydroxy acid (a-3) having at least two hydroxyl groups, wherein a content of the (a-3) in the alcoholic component is within a range of 1-20 mol % based on a total of the alcoholic component.

4. A water-based paint composition according to claim 1, in which the polyester resin (A) has a number-average molecular weight within a range of 300-50,000.

5. A water-based paint composition according to claim 1, in which the water-dispersible acrylic polymer particles (B) have a weight-average molecular weight within a range of 1,100,000-10,000,000.

6. A water-based paint composition according to claim 1, in which the absorbance of the polymer particles (B) at the wavelength of 330 nm as measured with spectrophotometer in the state of a liquid dispersion at a mass concentration of 1.35% in 1,4-dioxane solvent is not higher than 0.15.

7. A water-based paint composition according to claim 1, in which the water-dispersible acrylic polymer particles (B) are obtained by copolymerizing polymerizable unsaturated monomers in the presence of a reactive emulsifier having a polyoxyethylene group represented by a formula —$(CH_2CH_2O)_n$— (wherein n is an integer of 5-60) and polymerizable unsaturated group(s) per molecule.

8. A water-based paint composition according to claim 1, in which the water-dispersible acrylic polymer particles (B) have a hydroxyl value within a range of 0-150 mgKOH/g and an acid value within a range of 0.1-100 mgKOH/g.

9. A water-based paint composition according to claim 1, in which the hardening agent (C) is selected from the group consisting of melamine resin and blocked polyisocyanate compound.

10. A water-based paint composition according to claim 1, which comprises as non-volatile matter, each within a range of 1-90 mass % of the polyester resin (A), 1-80 mass % of the water-dispersible acrylic polymer particles (B) and 5-60 mass % of the hardening agent (C), based on a total solid resin content of the components (A), (B) and (C).

11. A multilayer coating film-forming method comprising applying onto a coating object an intermediate paint and a top paint successively, characterized in that the water-based paint composition as described in claim 1 is used as the intermediate paint.

12. A multilayer coating film-forming method, characterized by comprising applying onto a coating object the water-based paint composition as described in claim 1 as the intermediate paint, applying onto the unhardened coated surface thereof a water-based base coat paint, further applying onto the unhardened coated surface thereof a clear coat paint, and hardening the three-layered coating film formed of the intermediate coat, base coat and clear coat simultaneously.

13. Articles which are coated with the water-based paint composition as described in claim 1.

14. Articles which are coated by the multilayer film-forming method as described in claim 11.

15. Articles which are coated by the multilayer film-forming method as described in claim 12.

* * * * *